(12) United States Patent
Heck

(10) Patent No.: US 7,896,382 B2
(45) Date of Patent: Mar. 1, 2011

(54) PONTOON BOAT TRAILER GUIDE

(76) Inventor: Ronald R. Heck, Perry, IA (US)

( * ) Notice: Subject to any disclaimer, the term of this patent is extended or adjusted under 35 U.S.C. 154(b) by 0 days.

(21) Appl. No.: 12/475,984

(22) Filed: Jun. 1, 2009

(65) Prior Publication Data

US 2009/0297310 A1    Dec. 3, 2009

Related U.S. Application Data

(60) Provisional application No. 61/057,294, filed on May 30, 2008.

(51) Int. Cl.
*B60P 3/10* (2006.01)
(52) U.S. Cl. .................................. 280/414.1
(58) Field of Classification Search ............. 280/414.1, 280/414.2, 414.3; 414/498, 803
See application file for complete search history.

(56) References Cited

U.S. PATENT DOCUMENTS

| | | | |
|---|---|---|---|
| 3,455,472 A | 7/1969 | Rankin, Jr. | |
| 4,099,279 A | 7/1978 | Park | |
| 4,103,925 A | 8/1978 | Palamara | |
| 4,114,772 A | 9/1978 | Beelow | |
| 4,801,153 A | 1/1989 | Wilson | |
| 5,360,226 A | 11/1994 | Gussler, Jr. et al. | |
| 5,853,185 A | 12/1998 | Marshburn et al. | |
| 6,648,360 B1 | 11/2003 | Dray | |
| 6,648,578 B1 * | 11/2003 | Rouse | 414/482 |
| 6,663,130 B1 * | 12/2003 | Dray | 280/414.3 |
| 6,695,336 B1 | 2/2004 | Grabenstetter | |
| 6,719,317 B1 | 4/2004 | Grovender et al. | |

\* cited by examiner

*Primary Examiner*—Tony H. Winner
(74) *Attorney, Agent, or Firm*—McKee, Voorhees & Sease, P.L.C.

(57) ABSTRACT

A pontoon boat trailer guide includes a structure inbetween pontoon bunks or cradles. The guide structure comprises an upper portion which is narrower than a lower portion. The upper portion provides a visual and gross centering guide. The lower structure provides a fine and automatic self-centering guide for alignment and trailering of the pontoon boat.

20 Claims, 5 Drawing Sheets

US 7,896,382 B2

PONTOON BOAT TRAILER GUIDE

CROSS-REFERENCE TO RELATED APPLICATIONS

Figure 1A:
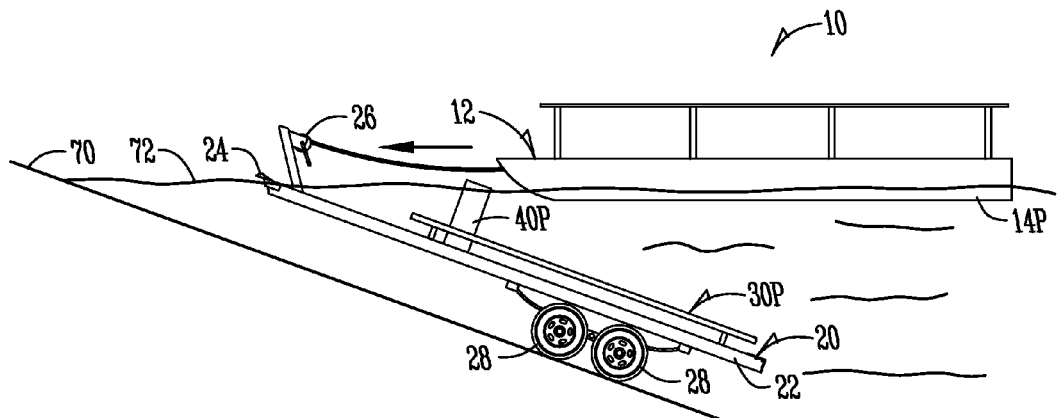

This application claims priority under 35 U.S.C. §119(e) to provisional application Ser. No. 61/057,294 filed May 30, 2008, herein incorporated by reference in its entirety.

I. BACKGROUND OF THE INVENTION

A. Field of Invention

The present invention relates generally to trailers and methods for loading watercraft vehicles. In particular, the present invention pertains to a trailer guide to assist in retrieving a pontoon boat from a body of water.

B. Problems in the Art

Trailers offer a number of advantages over transporting a boat directly upon an automobile, sport utility vehicle, pick-up truck, or flat-bed truck. Among these advantages are: (1) loading and unloading the boat at an elevation closer to the ground, (2) the ability to unload the boat directly into a waterway and reload the boat while still maintaining vehicle drive wheels upon dry ground for good traction, (3) ready storage with quick and simple retrieval by simply unhitching the trailer, and (4) the ability to load and transport boats much longer than the motor vehicle. Since in some instances the boats are loaded or unloaded on a daily basis, these trailers can greatly simplify the loading and unloading process.

Numerous attempts have been made to solve the problems of trailering watercraft and more particularly pontoon boats. Pontoon boats have presented some challenges to trailer design that are relatively unique and elusive to solve. It is well known in the prior art that retrieving a pontoon boat from the water is very difficult. One issue is the amount of assistance needed from persons other than the driver of the boat. Another issue is the amount of pontoon boat drift that can be caused by wind or current acting upon a boat already in the water. Various trailers and trailer guides have been utilized to address one or both of these issues.

In some cases, prior art trailers are designed to accommodate several different types of boats with distinct hull designs. However, most trailers are designed for only one or a limited few types of boat hulls. For example, a trailer designed to carry a typical fishing boat will be shaped to accommodate the relatively deep keel and steeply sloping sides of the boat. In contrast, a shallow water boat is designed with a relatively flat bottom. Consequently, a carrier designed to receive the keel and steep sides of a fishing boat will not receive and support a flat-bottom boat. The same holds true for other types of boats, such as catamarans and pontoon boats, which generally have unique multiple hull designs. These and other types of boats have consequently required specific trailer designs or accommodations.

In the specific case of a pontoon boat, the boat will generally include two or more hulls, commonly called pontoons, which are elongated tubes that may typically be sealed and hold air or another gas therein. Generally, across the top of the pontoons there will be attached a deck which supports passengers, a boat engine, and other various components, while simultaneously fixing the position of the pontoons relative to each other. One common technique for assisting a person with the loading and unloading of the boat is the utilization of rollers. For example, a hand or powered winch may be provided to draw the boat onto and across the rollers. Since the rollers are able to roll across the exterior of the boat, such as along the keel or along the port or starboard undersides, there is almost no scraping or sliding of the boat which would otherwise damage the boat. Additionally, there is reduced force required to move the boat over the rollers. Consequently, a winch and cable may be hand-turned in many instances, and such winch and cable are generally relatively low cost commodity items.

While the rollers tend to simplify the unloading of a boat, they do not provide adequate guidance for retrieving the boat. When trailing the boat, rollers are often beneath the surface of the water and are not visible to the operator of the boat. As a result, sub-surface rollers do not adequately address the difficulty of retrieving a multiple hulled boat, such as a pontoon boat, from a body of water. Conventional rollers have very little surface area in contact with the boat hull and therefore may not guide the boat into a resting position when the trailer is pulled out of the water. Another problem associated with rollers is that they may not provide good support for the boat. Again this is a result of the small surface area of the roller in contact with hull of the boat. At the point of contact, the forces placed upon the boat bull by the total weight of the boat and contents may cause the boat hull to deform. Even absent noticeable deformation, the stresses generated adjacent a roller tend to be very high, leading to premature failure of the boat hull. While additional contact may be obtained with the use of more rollers, which would thereby reduce the stress between the boat and any given roller, rollers tend to be relatively expensive. Consequently, supporting more than a very minor amount of surface area on the boat with rollers can be cost prohibitive.

Typical of this type of roller is that disclosed by Rankin in U.S. Pat. No. 3,455,472 issued on Jul. 15, 1969. Rankin utilizes axially spaced spools to support the keel of the boat. The rollers contact only a small surface area of the keel of the boat. Furthermore, the rollers utilized by Rankin would not be visible to the operator of the boat during conventional retrieval from water. Thus the rollers as disclosed by Rankin would not be ideal for retrieving and loading a pontoon boat. This can be particularly true in the presence of dramatic effects of drift caused by a current or side wind.

Another common technique for retrieving and supporting a pontoon boat upon a trailer is the use of V-shaped bunks, which are angled solid surfaces against which a boat hull(s) is rested; typically along a substantial amount of the longitudinal length of the hull(s). In the case of a V-shaped bunk trailer for a dual-pontoon pontoon boat, the pontoons are solidly supported across and along substantially the entire bunk, rather than across a few square inches of roller. Since such bunks are low-cost, typically comprising little more than a beam having a non-marring surface, the cost of supporting a large surface area is quite small and economical. It also leads to better transport, including a substantial reduction in the stress forces generated within the boat hull and a resultant reduction in the likelihood for damage to the boat during transport. Unfortunately, however, this type of trailer provides very little assistance in guiding a multiple-hulled vessel, such as pontoon boat, to a final resting position. To illustrate, when retrieving the boat the margin of error to "fit" each pontoon into its respective V-shaped bunk is very small; often around 4 inches. The operator also does not have convenient visual signposts to determine proper alignment as the trailer and V-shaped bunks are mostly submerged and not readily visible. Further complicating the retrieval of the pontoon boat can be the presence of a side wind, transverse currents, or other side forces. They may cause the boat to drift or move considerably, making it even more difficult to align the boat so that the pontoons fit into their V-shaped bunks.

Typical of a trailer utilizing V-shaped bunks is that disclosed by Wilson in U.S. Pat. No. 4,801,153 issued on Jan. 31, 1989. In this trailer, a pair of glides is provided for supporting each of the pontoons. A winch is provided for pulling the pontoon boat onto the trailer. Rollers are associated with each glide such that as the winch is operated to pull the pontoon boat onto the trailer, the pontoons engage the rollers which are intended to enable easier movement of the pontoon boat. Vertical supports 72 extend from the trailer frame upward at essentially exactly the inside distance between pontoons 62 and 64. Supports 72 can be used to guide the boat onto the trailer. However, it is well known that when loading a boat, the trailer must be at least partially submerged in order to begin the loading process. Otherwise, the boat would have to be lifted from the water prior to loading it on the trailer. After the rear of the trailer has been submerged, the boat is floated over at least a portion of the trailer and then a cable connected at one end to the winch is connected at its distal end to the boat (usually the bow). The winch is then operated to pull the bow of the boat toward the front end of the trailer. When the boat is floated over the trailer, it is well known that the boat must be maintained in alignment over the trailer such that when the trailer is pulled from the water and the boat engages the trailer, the entire boat drops into and is perfectly nested in the trailer. If the boat is not in alignment with the trailer, damage may be sustained by one or both. The boat-loading process must be reversed and started over. It can take several tries. Sometimes, especially with significant cross winds or currents, loading can be unmanageable. It is well known that boats tend to drift when in the water, making the task of loading the boat difficult. Although Wilson U.S. Pat. No. 4,801,153 discloses a trailer adapted for loading and carrying a pontoon boat, he does not account for drift. Typically, there will be at least one person in the water around the boat to assist in aligning the boat over the trailer. This is in addition to the person who attaches the winch line to the boat and operates the winch to pull the boat over the trailer. Because of the problems caused by boat drift, it is known that it is difficult, and in many instances impossible, to load a pontoon boat by one's self, or without having to have at least one person in the water to align the boat with the trailer.

A technique used to remedy the affects of drift and provide assistance to the operator while retrieving the boat is to use upwardly extending guide posts. Typical of this arrangement is that disclosed by Marshburn in U.S. Pat. No. 5,853,185 issued on Dec. 29, 1998. In this trailer, a pair of guide posts may be pulled apart to engage the interior side of each pontoon. The two guide posts are biased against each other by a tension spring. A winch mounted on the trailer pulls the guide posts apart until engagement with the interior side of the each pontoon. One problem associated with trailers utilizing a straight inside guide as disclosed by Marshburn is retrieving a pontoon boat fitted with strakes. A strake, as is understood in the art, is an angled metal appendage that is welded to the interior lower quarter of each pontoon tube. Strakes can run for along the lower quarter of the pontoon for the entire length of the boat or less depending on the use of the boat. Boat owners often use strakes to help the boat plane and increase the top end speed of the boat to facilitate activities such as water skiing or getting air beneath a wakeboard. A strake increases available flat lifting surface to help generate more lift. However, a problem occurs when an operator retrieves a pontoon boat from a body of water using a trailer guide with straight inside guides. As the trailer is pulled out of the water, the strake tends to land on top of the guide and is thereby prevented from settling into the V-shaped bunk. Accordingly, a problem is presented when attempting to reduce the affects of drift while still allowing for the retrieval and loading of pontoon boats fitted with strakes. Strakes or other outwardly extending features on pontoons can make it more difficult to accurately trailer the pontoon boat, even in calm water.

Other trailers have been disclosed having guides to launch and load boats from and onto trailers. Examples are disclosed by Park in U.S. Pat. No. 4,099,279 and Palamara in U.S. Pat. No. 4,103,925. Each disclose side rails for guiding a boat onto a trailer. These trailers are used for carrying a single hull boat such as a ski boat or fishing boat. The side rails, as illustrated, may be helpful in nesting a pontoon boat onto a trailer, but interfere with loading the boat onto the trailer when the boat becomes misaligned with the trailer due to, for instance, side wind.

Beelow, U.S. Pat. No. 4,114,772, discloses a trailer which may be raised and lowered in order to assist in the launching and loading of a pontoon boat. In order to load a pontoon using the Beelow trailer, the pontoon must be stabilized, generally on land. The trailer is then backed under the pontoon. When the trailer is positioned under the boat, the trailer is lifted into engagement with the boat. This device does not disclose a means for aligning the boat with the trailer to assist in the loading process. Notably, and most importantly, Beelow does not disclose a method for overcoming the effects of drift on a pontoon boat in the water while approaching the trailer.

II. SUMMARY OF THE INVENTION

There is a need in the art to provide for a means of retrieving a pontoon boat. This is especially the case for pontoons fitted with strakes or other features. There is also a need for the operator of the boat to be visually aided in aligning the boat onto the trailer to automatically compensate for, or mitigate, the effects of drift caused by, e.g., side wind or transverse currents. A need exists for analogous storage of other apparatus, including but not limited to other multiple-hulled watercraft.

In one aspect of the invention, a pontoon boat trailer guide is secured to or made a part of a conventional pontoon boat trailer having parallel longitudinal V-shaped bunks or receivers for the pontoons. The trailer guide comprises a structure that extends upwardly from the general plane of, and between, the bunks or receivers on the trailer. The trailer guide includes opposite lateral sides having lower ends proximate the bunks or receivers. The opposite lateral sides converge towards each other as they extend upwardly. The distance between the tops of the opposite lateral sides is substantially smaller than the lateral distance between the insides of the pontoons, but the distance between the lower ends of the opposite lateral sides is close to the lateral distance between the pontoons. The trailer guide can be positioned in-between the front and back ends of the trailer along the longitudinal axis of the trailer. The opposite outer lateral sides are configured to provide initial gross alignment of the pontoons relative the longitudinal axis of the trailer, but increasing fine and automatic alignment as the pontoons are brought closer to their bunks or receivers on the trailer. The sloped or narrowing opposite lateral sides of the trailer guide automatically force the pontoons to come into increasingly closer vertical alignment with their bunks or receivers the closer the pontoons come to the bunks or receivers. This facilitates assistance and guidance, with a larger margin of error, during initial trailering, but self-assists the precise alignment of pontoons as the boat settles into the trailer during trailing. This can be particularly beneficial in the presence of side winds or lateral currents, where there is only one or two persons trailing the boat, and/or when there are strakes or other features extending from the surface of one or more of the pontoons.

As can be appreciated, the trailer guide can take many forms and configurations. In one specific form, the trailer guide can be configured as a pair of generally A-frame shapes. They can be mounted to the trailer (e.g. along a lateral cross beam) intermediately between front and back of the trailer and generally centered on opposite sides of the trailer longitudinal axis. The position and width of the A-frames can be adjusted relative the trailer to adjust the height and slope of the sides for different boats. The pair of A-frames can be oriented to guide a pontoon boat into a proper final resting position. The A-frames have two connected members forming the outline shape of an "A." The A-frames can be secured nearer the longitudinal midpoint of the trailer than the front or back. Alternatively, they may be placed at different longitudinal locations along the trailer. The A-frames may also be adjusted laterally on a cross member of the trailer to reflect the width of the pontoons, more specifically the interior distance between the pontoons and, if applicable, the distance between strakes or other external features of each pontoon. The A-frame members provide opposite outer sides that are converge as they extend upward from the trailer frame. Those outer sides can include a surface or facing having characteristics which promote sliding engagement with and deter damage to a pontoon of the pontoon boat to assist the pontoon into final resting position in its V-shaped bunk or other receiver when the trailer is pulled from the water. The height of the A-frames can be selected to be visible to the operator of the boat when retrieving and loading the pontoon boat onto the trailer.

In another aspect of the invention, the A-frames could be replaced with different shapes that present opposite outer sides that are sloped or converge towards the tops of each member. Still further, instead of two guides, a single guide could be fashioned with outer sides that converge towards the top of the single member.

In other embodiments of the invention, additional guide member(s) may be positioned at other locations along the longitudinal axis of the trailer for additional assistance in retrieving a pontoon boat and guiding it to a resting position.

A method for loading a pontoon boat onto a trailer would include the steps of providing a trailer with a guide member or members that are positioned along the longitudinal axis of the trailer and extend upwardly from the general horizontal plane of the trailer with converging opposite outer lateral sides. The opposite outer lateral sides would be configured to provide initial gross alignment of the pontoons relative the longitudinal axis of the trailer, but increasing fine and automatic alignment as the pontoons are brought closer to their bunks or receivers on the trailer. The boat is manipulated or steered over a trailer into an initial receiving position such that the pontoons are preliminarily aligned with their bunks or receivers on the trailer. The guide member or members, in one form the A-frame guides, guide the pontoon boat into a resting position wherein the pontoon contacts the outer opposite lateral sides when the trailer is pulled out of the water, and settling the pontoon boat into a final resting position.

III. OBJECTS, FEATURES, ADVANTAGES AND ASPECTS OF THE INVENTION

It is therefore a primary object, feature, advantage and aspect of the present invention to provide a trailer guide for assisting in the retrieval of and trailering of a pontoon or multi-hull boat from a body of water. Further objects, features, advantages, and/or aspects of the invention include an apparatus and method for assisting in the retrieval of and trailering of a pontoon boat from a body of water which:

1. reduces the assistance required to retrieve the boat;
2. aligns the boat when a side wind causes the boat to drift;
3. facilitates loading of a boat fitted with strakes or other features extending from the pontoons or hulls;
4. guides the boat to a resting position when the trailer is pulled out of a body of water;
5. provides a trailer guide which is visible to the operator when the trailer is partially submerged;
6. provides a guide which may be adapted to any conventional pontoon boat trailer; and/or
7. provides a guide which allows the trailer to fit within the lanes of highway.

Other objects, features, advantages, and/or aspects of the present invention will become apparent from the accompanying specification.

IV. BRIEF DESCRIPTION OF THE DRAWINGS

A. Drawings

Figure 1B:
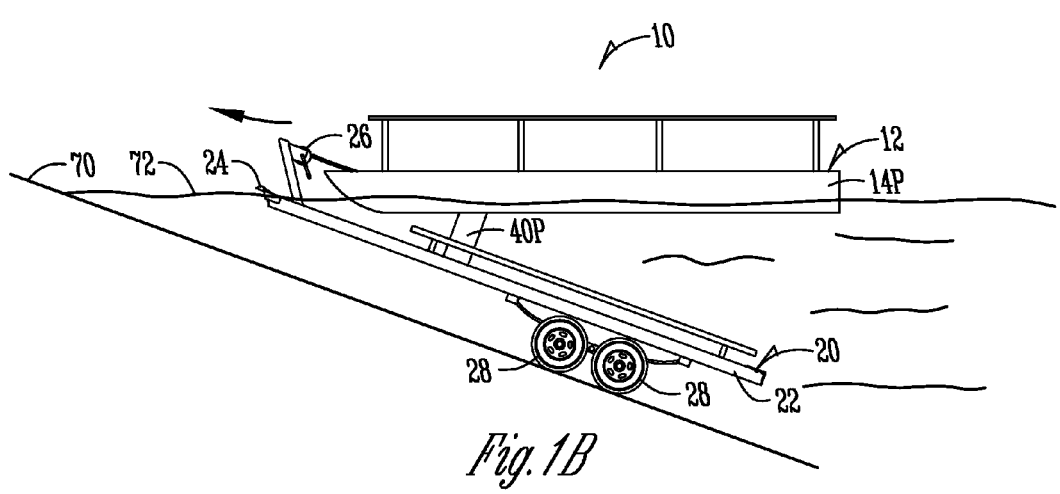
Figure 1C:
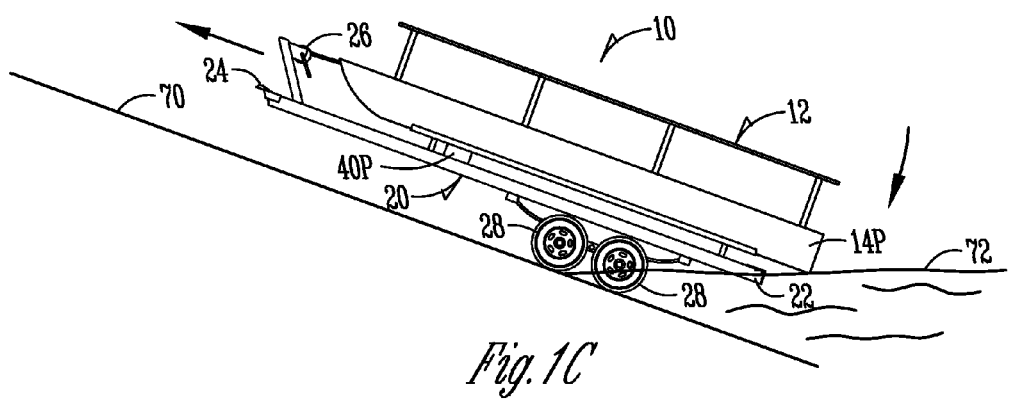

FIGS. 1A-C are side elevation diagrammatic depictions of a method of trailering a pontoon boat onto a trailer according to a first exemplary embodiment of the present invention.

Figure 2A:
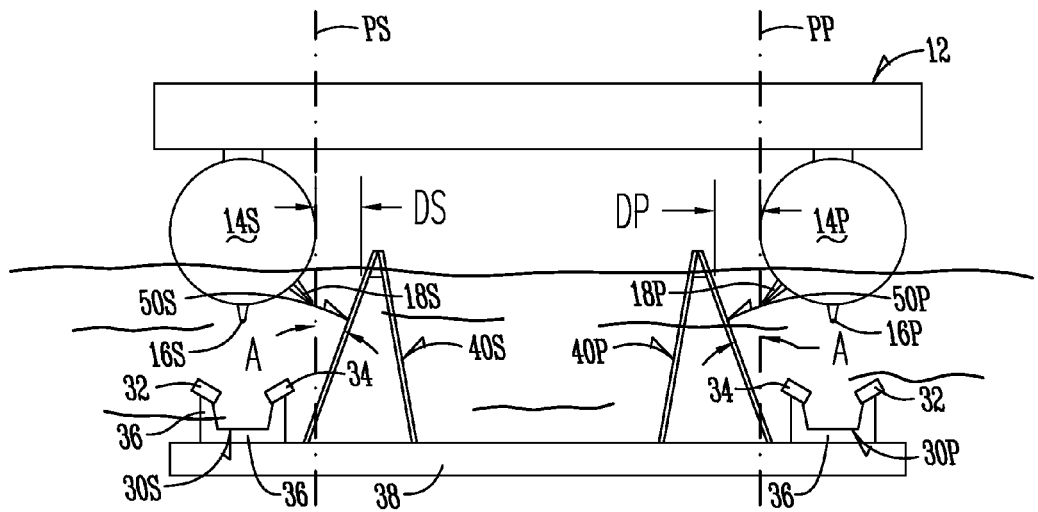
Figure 2B:
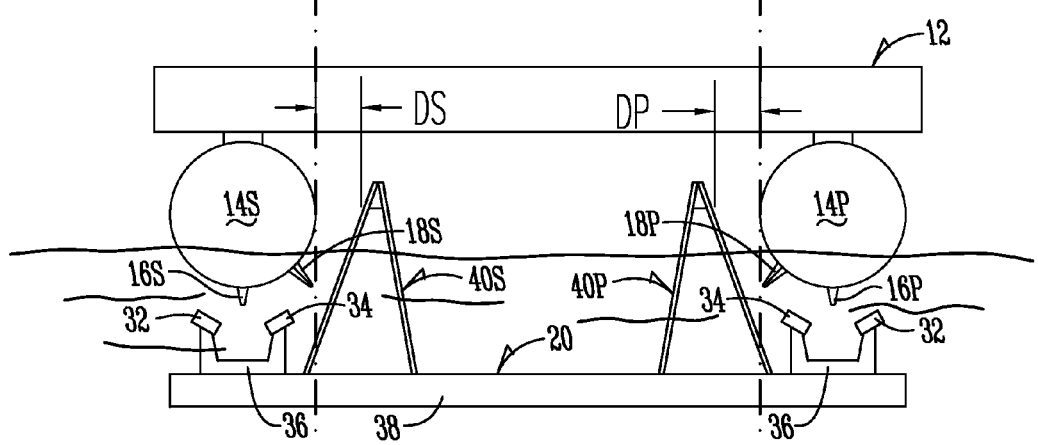
Figure 2C:
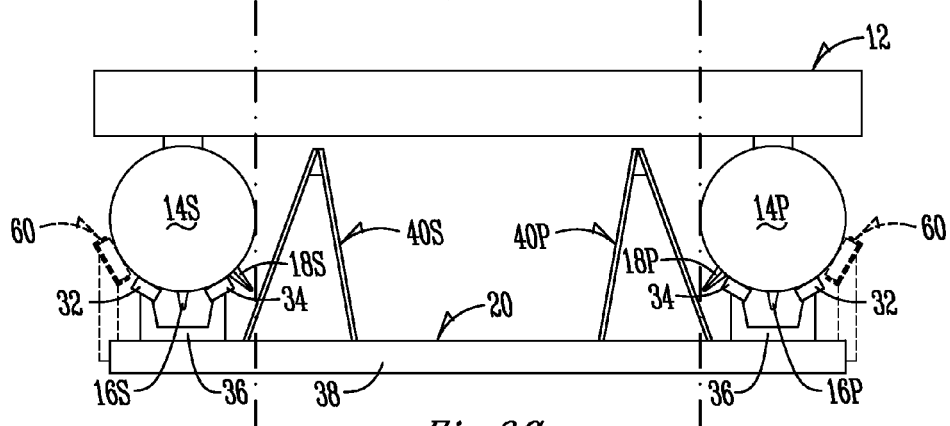

FIGS. 2A-C are enlarged front elevation views corresponding to FIGS. 1A-C.

Figure 3:
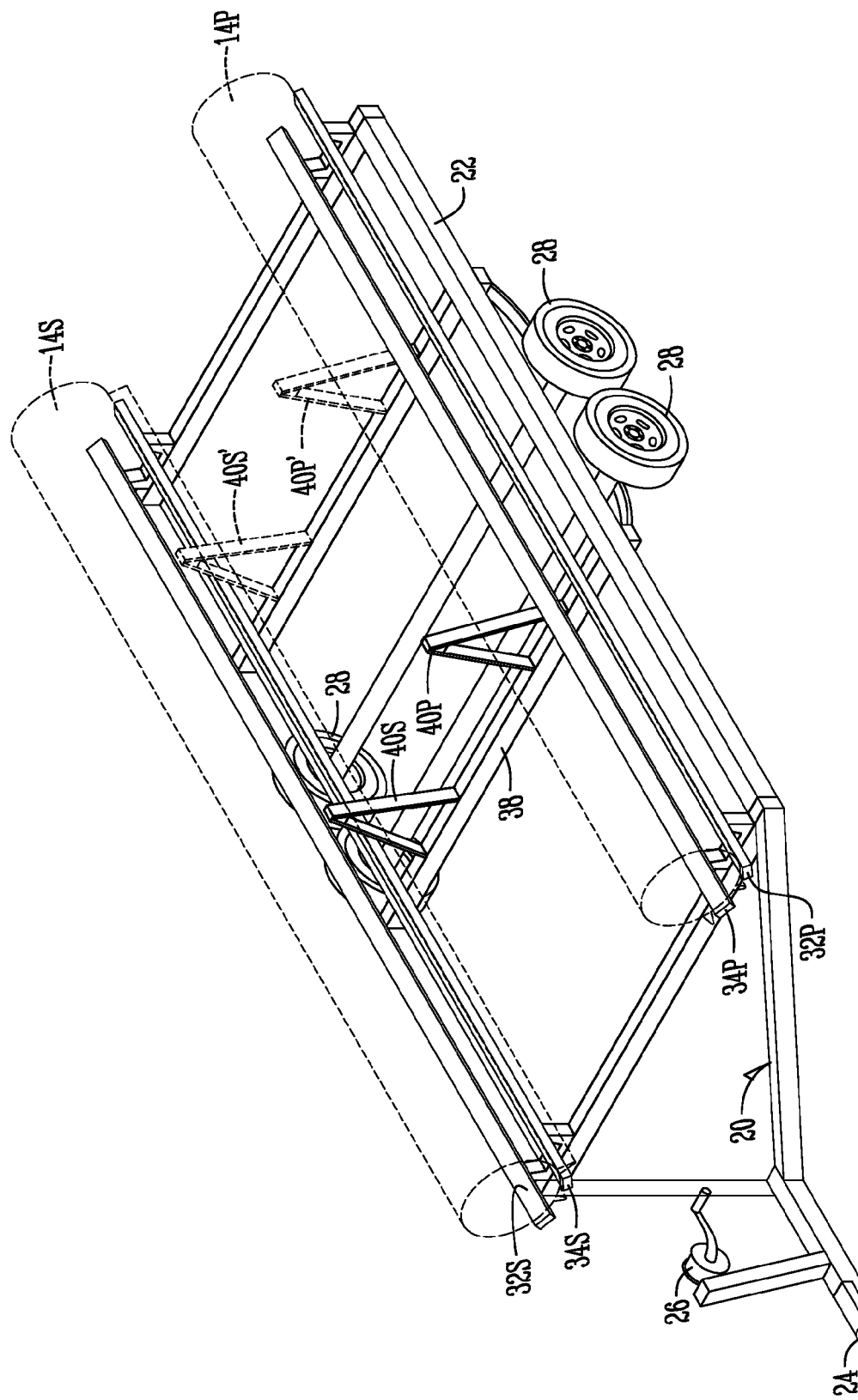

FIG. 3 is a reduced-in-scale perspective view of the trailer according to the first exemplary embodiment of the present invention.

Figure 4A:
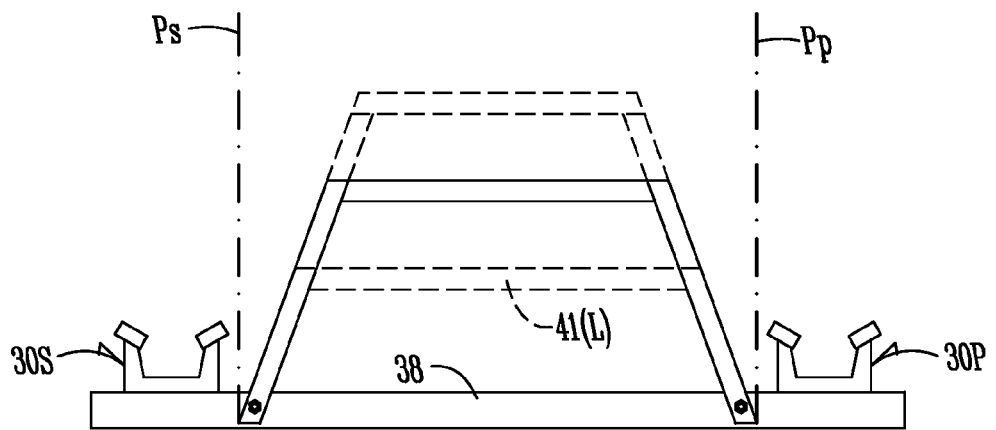
Figure 4B:
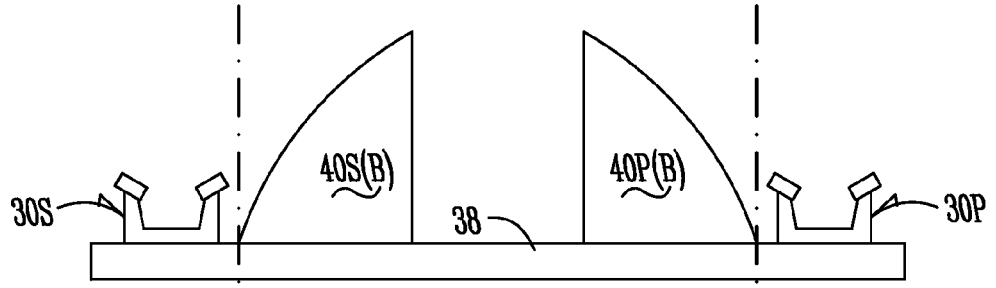
Figure 4C:
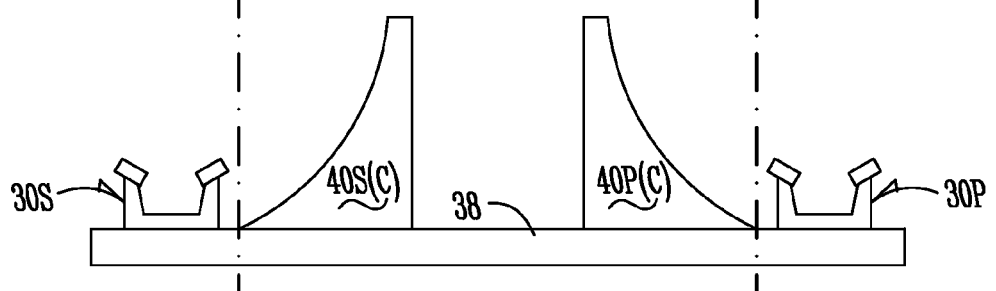

FIGS. 4A-C are diagrammatic views showing alternative shapes and forms for the pontoon boat trailer guide according to additional exemplary embodiments of the invention.

Figure 5:
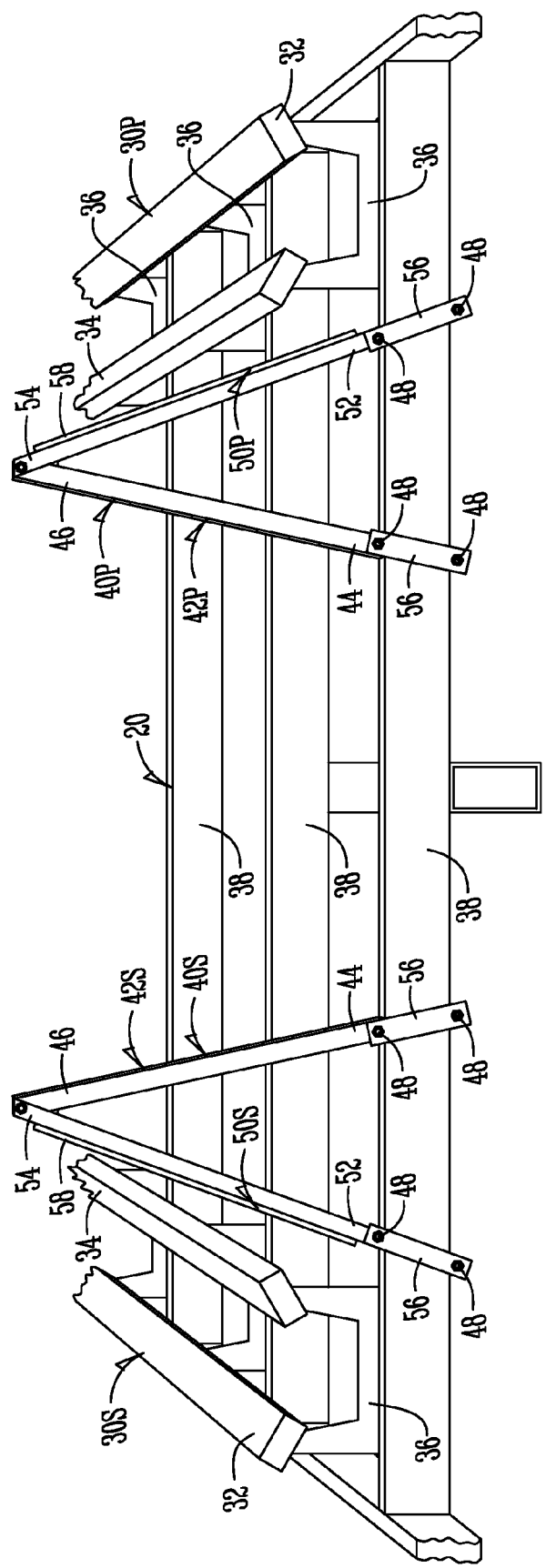

FIG. 5 is a perspective depiction looking up at the trailer according to the first embodiment of FIGS. 1A-C, 2A-C and 3 from the front.

IV. DETAILED DESCRIPTION OF EXEMPLARY EMBODIMENTS OF THE INVENTION

A. Overview

For a better understanding of the present invention, specific exemplary embodiments according to present invention will be described in detail. These embodiments are by way of example and illustration only, and not by way of limitation. The invention can take many forms and embodiments. Variations obvious to those skilled in the art will be included within the invention.

Reference numerals will be used to indicate certain parts and locations throughout the Figures. The same reference numerals will be used to indicate the same or similar parts and locations throughout the Figures unless otherwise indicated. The letters "S" and "P", unless otherwise indicated, are intended to refer to starboard and port sides, respectively of boat 10 and corresponding sides of trailer 20.

B. Apparatus of First Exemplary Embodiment

A pontoon trailer guide 40S/40P incorporating various features of a first exemplary embodiment of the present invention is depicted generally in FIGS. 1A-C, 2A-C, 3, 4, and 5. The trailer guide 40S/40P is designed for assisting the operator of a pontoon boat 10 in retrieving and trailering boat 10 from water, and reducing the effects of drift. In this first exemplary embodiment, guide 40S/40P comprises a pair of individual A-frames 40S and 40P removably connected to pontoon boat trailer 20. Trailer guide 40S/40P is designed to be adapted to essentially any conventional pontoon boat trailer with v-shaped bunks, cradles, or receivers 30S and 30P for receiving and supporting pontoons 14S and 14P of boat 10.

Each A-frame 40S and 40P comprises two elongated sections or members 42 (the middle and most upright member) and 50S, 50P (the outer lateral more angled member) of angle iron pivotally connected at their tops 46 and 54 respectively (e.g. by a bolt and nut or other fastener that allows pivotal movement between the members) to form the general outline shape of an "A." Each A-frame member 42 and 50S, 50P is connected at its lower or bottom ends (44 and 52 respectively) to a cross-member 38 of the trailer 20 by way of a clamp, bolt, locking washer, and nut (or other fastener or combination of fasteners) such that the A-frames are securely fastened in a desired position but can be adjusted. See FIG. 5.

Because A-frames 40S and 40P are detachably secured to the trailer, they may also be longitudinally placed at different locations on the trailer 20 (e.g. different cross beams) depending on need or desire. A-frames 40S and 40P can mounted to different positions longitudinally along trailer 20. One reason to mount them further to the front of trailer 20 would be if the ramp is steeper so that the water is deeper when the back end of trailer 20 is submerged.

Also, bottom ends 44 and 52 of A-frame members 42 and 50S, 50P can be secured to different positions along cross-member 38. For example, as shown in the Figures, the bottom of each A-frame leg can be clamped along a horizontal cross-member of the trailer frame (e.g., by tightening to lower ends 44 and 52 of A-frame members 42 and 50S, 50P a rigid piece with two bolts above and below, and on an opposite side of, the frame cross members—see 56, e.g., 48, FIG. 5). Another alternative, e.g., is multiple apertures could be pre-drilled through cross member 38 corresponding to different mounting positions for the bottom ends of A-frame members 42 and 50S, 50P. Depending on any of a variety of factors, including but not limited to distance between pontoons of the boat to be trailered, each A-frame guide 40S and 40P can be mounted in a selected position on trailer 20. In this embodiment, the placement of A-frames 40S and 40P on a cross-member 38 of the trailer 20 is essentially laterally adjustable relative to the pontoon boat 10 depending, e.g., on the interior distance between the pontoons 14S and 14P of the pontoon boat 10 and, more particularly in this embodiment, the distance between the strake 18 of each pontoon 14S and 14P. Depending on the width of the mounting positions of A-frame members 42 and 50S, 50P on trailer cross-member 38, the slope of A-frame members 42 and 50S, 50P also changes.

The A-frames may also be adjusted to vary the slope of the outside side of each. A steeper or flatter obtuse angle relative to the inside of a pontoon 14S or 14P is allowed using the same members 42 and 50S, 50P. Selection of that angle can vary according to need or desire, and the demands of the pontoon boat which is being trailered.

The A-frames have a surface or facing 58 (e.g., FIG. 5) for sliding engagement with a pontoon 14S or 14P of the pontoon boat 10, assisting the pontoon 14S or 14P to settle into the V-shaped bunks 30S and 30P when the trailer 20 is pulled from the water. In the first embodiment, facing 58 is a wooden 2×4. Other or additional materials or components could be used with facing 58.

FIGS. 1A-C, 2A-C, 3, 4, and 5 illustrate additional details regarding the first exemplary embodiment. Conventional pontoon boat-type trailer 20, of the style commercially available from a variety of vendors, has the following conventional components. A basic rectangular (usually structural metal tubing) frame 22 with wheels 28 extends from a forward hitch 24 to back end. Port and starboard pontoon bunks or cradles 30S and 30P are longitudinally fixed on opposite lateral sides of trailer 20. In this embodiment, cradles 30S and 30P are essentially a pair of wood 2×4s 32 and 34 raised above the frame plane by U-shaped supports 36. Supports 36 extend from either cross beams or longitudinal beams of frame 22. As is well known, the V-shaped nature of cradles 30S and 30P are designed to cradle or receive the bottom laterally convex surface of a pontoon 14P or 14S substantially all along the pontoon. As is further conventional, cradles 30S and 30P are fixed at essentially the precise distance between pontoons S and P. The wood 2×4s 32 and 34 thus provide a material upon which pontoons 14S and 14P of pontoon boat 10 rest during transport or storage and which is likely to be gentle on the metal pontoons. As is typical, wheels 28 (single axle or tandem axle sets) are conventionally located on trailer 20.

These conventional components of trailer 20 are modified by the following components.

A-frame guides 40S and 40P attach to a cross beam 38 at lower ends and extend upward from the general horizontal plane of bunks or cradles 30S and 30P of trailer 20 at or near its middle and between cradles 30S and 30P. As shown in the drawings, the geometry and dimensions of guides 40S and 40P are designed such that when pontoon boat 10 is in final trailered position on trailer 20, the tops of guides 40S and 40P do not reach to the bottom of deck 12 of pontoon boat 10, but extend at least a substantial amount of the vertical height of pontoons 14S and 14P (see, e.g., FIG. 2C).

As noted in FIG. 5, each A-frame guide 40S or 40P, in this embodiment, is comprised of an upright member 42 having a bottom end 44 that is removably fastened to cross member 38. What will be called angled section 50S, 50P of guide 40 is similarly removably connected to cross member 38 at clamp, fastener or connection 56 at its bottom end 52 (and/or bottom of member 42) and extends upwardly. Upright 42 and angled member 50S, 50P can be made of angle iron. Analogous members, e.g., could be tubes, beams, boards, etc. Alternative materials comprising these materials are also, of course, possible and may include plastic, graphite compounds, etc. Top ends 46 and 54 of upright member 42 and angled member 50S, 50P are pivotally connected by fastener or connection 48, e.g. bolt or other fastening means. What will be called a facing 58 can be mounted along the outside facing side of angled member 50S, 50P. In this embodiment, facing 58 can simply be a wood 2×4 of the geometry and dimensions illustrated in the Figures. The surface of A-frame guides 40S and 40P may be formed from a plastic such as polytetrafluoroethylene (Teflon) to provide a low-friction coating to allow the pontoon to slide easily to a resting, loaded position when the guide submerged. Alternative surface materials are, of course, possible so long as they provide a low-friction surface when the guide is fully or partially submerged. A Teflon surface allows the boat to better slide into a resting, loaded position when the trailer is pulled out of the water. Additionally, a Teflon surface would minimize scuffing and scratching of the strake and pontoon. Other facings are possible. It is also possible to leave off any facing.

FIG. 2A-C illustrate further geometrical relationships between guides 40S and 40P, pontoon boat 10, and trailer 20. Note how the A-frame type nature of guides 40S and 40P provide structural rigidity and the ability to handle substantial lateral forces. Pontoons 14S and 14P can collide against the guides during trailing. The designer would select the material and size of members 42 and 50S, 50P, as well as the fastening members, commensurate with the structural characteristics deemed needed or desired. It has been found that angle iron of the general configuration and proportions shown in FIG. 5 functions at least reasonably well for a boat of the size and type shown in that Figure. Note also that in this embodiment, guides 40S and 40P are generally mirror-images of one another and in the same general vertical plane roughly midway between back and front of trailer 20. The height of guides 40S and 40P, in this embodiment, are limited primarily by the distance between the bottom of pontoons 14S and 14P and the bottom of deck 12 of boat 10. In other words, 40S and 40P are designed to extend as high as possible without abutting the bottom of deck 12 when pontoons 14S and 14 P are settled in cradles 30S and 30P. Importantly, however, is the flexibility of this first embodiment. By adjustment of such things as, inter alia, longitudinal position, mounting width of the legs of each A-frame 40S and 40P, length of the legs of each A-frame 40S and 40P, the designer can configure guides 40S and 40P to meet a variety of different functions and objectives. The guides 40S and 40P can be adjusted to different configurations for trailering different boats on the same trailer, or for different relationships to the same boat on that trailer.

A common feature of the different configurations of guides 40S and 40P is they provide a larger margin of error relative to alignment with pontoons 14S and 14P when boat 10 is brought above a partially submerged trailer 20. This is because the inwardly converging opposite lateral sides (opposite angled sides 50S, 50P) of guides 40S and 40P have a substantially narrower horizontal total width than the distance between pontoons 14S and 14P. But the lower ends or base of guides 40S and 40P have a cumulative lateral width that approaches the distance between pontoons 14S and 14P. The relatively constant slope between top and bottom of each angle member 50S, 50P in this first embodiment allows rough or gross alignment of boat 10 to trailer 20 initially, with a substantial margin of error, but increasing precise or finer alignment as boat 20 settles onto trailer 20. As pontoons 14S and 14P approach cradles 30S and 30P, guides 40S and 40P more closely force pontoons 14S and 14P into vertical alignment with cradles 30S and 30P.

In this embodiment, pontoon boat 10 has structures extending from the perimeter of pontoons 14L and 14R. Ribs 16S and 16P extend downwardly from the middle spine of each pontoon 14S and 14P respectively. The function for these ribs 16S and 16P is well known in the art. Additionally longitudinally and inwardly extending members (strakes) 18S and 18P extend angularly downward and inward from the inner side of both pontoons 14S and 14P respectively. Strakes 18S and 18P assist in helping boat 10 plane on the water at higher speeds.

As previously discussed, and as can be well appreciated, these extensions 16 and 18 from pontoons 14 create even more difficulty in correctly trailering pontoon boat 10. These extensions can snag or block the correct settling of pontoons 14 in cradles 30, especially if boat 10 is docked exactly longitudinally aligned with trailer 20. Ribs 16 or strakes 18 could catch or be blocked by either wood 2×4 32 or 34, or even other parts of the trailer, when boat 20 is in the process of being trailered. The fixed relationship of extensions 16 and 18 relative to pontoon 14, and the need for accurate alignment with cradles 30, accentuates the difficulties in obtaining correct position of pontoons 14 to cradles 30 on trailer 20. As mentioned, this is particularly the case with cross winds, cross currents or waves, or other forces that tend to move or misalign boat 10 with trailer 20.

For purposes of this discussion, FIGS. 2A and C diagrammatically illustrate two vertical planes labeled PS and PP. These vertical planes pass through the distal edges of strakes 18S and 18P respectively. These planes indicate the most inward extension of pontoons 14S and 14P relative to vertical.

FIGS. 2A-C also show the angle A between angled members 50S, 50P of guides 40S and 40P and planes PS or PP. In this embodiment, angle A is set to be on the order of 25°. This can be adjusted according to need or desire. Additionally, note in FIG. 2C how the very bottoms of angle members 50S, 50P do not quite extend to planes PS and PP. Furthermore, guides 40S and 40P are generally mirror images of one another on opposite sides of the longitudinal axis of trailer 20.

The first exemplary embodiment provides structure between the cradles 30S and 30P which performs the following types of functions.

First, it provides a visual reference for centering boat 10 relative to trailer 20. The upper ends of guides 40S and 40P extend from and well above the general horizontal plane of cradles 30S and 30P. As illustrated in FIGS. 1A and B, this allows the tops of guides 40 to be visible even when trailer 20 is substantially submerged.

Secondly, by angling the opposite lateral sides of guides 40 upward and inwardly, a substantial margin of error is designed when first trying to align boat 10 for trailering. As indicated at FIGS. 1A-C, the conventional trailering procedure comprises hitching the bow of boat 10 to winch 24 of trailer 20 after backing trailer 20 to be substantially submerged in water 72 by backing down sloped ramp 70. Guides 40 provide the visual reference (see also FIG. 2A) to the winch operator for gross centering of boat 10 relative to trailer 20. Unlike previously mentioned patents to Wilson and others having vertical guides, angle A for guides 40S and 40P allows significant initial margin of error during the first part of trailering. However, as trailering proceeds, such as by winching the bow of boat 10 to the front of trailer 20 (see FIGS. 1B and 2B), angle guides 40S and 40P come closer to pontoons 14S and 14P. In other words, distances DS and DP decrease between the positions of boat 10 relative to trailer 20 in FIGS. 2A and 2B. Guides 40 thus began to serve the function of a finer adjustment (as opposed to gross adjustment). Also, forces that move boat 10 laterally would be limited by pontoons 14 coming into contact with one or more of guides 40. For example, a cross wind from left to right in FIG. 2B might move boat 10 to the right but guide 40S would function as a mechanical stop relative to strake 18S that would not allow boat 10 to move substantially out of alignment with trailer 20.

A final trailing step conventionally involves pulling trailer 20 (e.g. with an automotive vehicle such as a car or truck), with the bow of boat 10 winched towards the front of trailer 20 as in FIG. 1B, out of water 72 and up ramp 70 (see FIGS. 1C and 2C). During that process, guides 40S and 40P would serve to increasingly finely position and guide pontoons 14S and 14P into precise alignment with cradles 30S and 30P until boat 10 is fully supported on cradles 30S and 30P and in exact alignment. In other words, in this embodiment, distances DS and DP (see FIGS. 2A-C) would gradually and continually decrease to adjust in self-centering of boat 10 on trailer 20.

Because the bow of boat 10 is securely winched right up to winch 26, that connection is substantially a fixed point. The pair of guides 40S and 40P, positioned back towards the middle of trailer 20, would tend to self-center the remainder of boat 10 to trailer 20. This would be done in a gentle and increasingly precise manner. This, again, provides a larger margin of error initially but then almost automatic self-centering in a finer and finer manner as trailer 12 is pulled out of water 72.

It can therefore be seen that this embodiment assists an operator with the trailering of a pontoon boat. A major feature is this combination of an initial gross positioning device that then becomes a finer positioning device. This assists the process of trailering a boat in any condition. It can be particularly helpful when forces tend to try to move the boat away from or make it difficult to manually keep boat 10 aligned with trailer 20. This also avoids damage to boat or trailer that can occur when guides do not allow any margin of error.

As illustrated diagrammatically in FIGS. 1A-C and 2A-C, in operation, the operator of boat 10 would steer the boat over trailer 20 fitted with V-shaped bunks or cradles 30S and 30P as well as the aforementioned A-frame guides 40S and 40P (FIGS. 1A and 2A). Trailer 20 is in receiving position wherein trailer 20 is partially submerged in body of water 72 by backing trailer 20 down inclined ramp 70. The operator attempts to guide pontoon boat 10 over partially submerged trailer 20 so that pontoons 14S and 14P are between guides 40S and 40P. Boat 10 is secured to trailer winch 26 by means of a cable or rope prior to pulling trailer 20 out of water 72. As trailer 20 is initially pulled out of water 72 (up ramp 70) (FIGS. 1B and 2B), one of pontoons 14S and 14P will usually contact the facing or sliding surface 58 of one of guides 40S and 40P, which acts as a mechanical stop. As trailer 20 continues up ramp 70, the pontoon in abutment with one of guides 40S or 40P will slide down the corresponding facing 58. This will bring the other pontoon closer to its corresponding facing 58. As this continues, the increasing width between facings 58 on each guide 40S and 40P will force pontoons 14S and 14P to align directly with cradles 30S and 30P. Pontoons 14S and 14P are guided to a final resting position suitable for hauling the boat.

C. Advantages

The first embodiment offers a plurality of advantages over prior art methods. Unlike prior art methods, the trailer guide of the present invention reduces the effects of drifts and visually aids the operator in retrieving the boat. The A-frames allow the operator to gauge the proper alignment for the pontoon boat when a variety of forces are acting to prevent proper alignment. The A-frames protrude above the surface of the water thus giving the operator a target to steer the boat towards. The margin of error for positioning a pontoon boat on a trailer with V-shaped bunks can often be around 4 inches. Without the use of a guide, this small distance requires a careful, precise operator in addition to another person to steady the boat. It is an advantage of the first embodiment that an operator is provided a significant visual indicator in aligning the boat.

Another advantage is that the A-frame guides provide proper positioning for a pontoon boat whether or not fitted with strakes or other external features.

D. Options and Alternatives

The present invention can take many forms and embodiments. Variations obvious to those skilled in the art will be included within the invention. A few non-inclusive examples follow.

The specific materials and dimensions and configurations of forms the invention can take can vary.

The first embodiment has one set of two A-frame guides 40S and 40P for retrieving the pontoon boat and guiding it to a resting position. One A-frame guide could be used. Alternatively, additional A-frame guides may be positioned at other locations along the longitudinal axis of the trailer for additional assistance in retrieving a pontoon boat and guiding it to a resting position.

Also, while the exemplary embodiments described above focus on retrieving a pontoon boat, the methods and apparatus can be used in analogous manners to other multiple-hulled watercraft. On example is a catamaran. A person could secure the trailer guide on a trailer and gain the same advantages realized with a pontoon boat. Specifically, the hull(s) of catamaran would be guided into a v-shaped bunk.

As can be well appreciated, guides 40S and 40P can function well with pontoons that have or do not have ribs 16 and/or strakes 18 and/or other external structures or features. They would still serve as substantial self-centering guides for the pontoons. Also, guides 40S and 40P could be adjusted so that angle portions 50S, 50P have lower ends that move closer or farther away from vertical planes PS and PP to accommodate pontoons with different external geometries.

FIG. 3 shows a specific optional alternative embodiment in dashed lines. A second set of guides 40P' and 40S' could be added at a different longitudinal location along the center of trailer 20. They could have the same shape as guides 40S and 40P or a different shape according to need and desire. Still further, additional guides could be included, over and above the two sets 40S/40P and 40S'/40P' shown in FIG. 3.

FIGS. 4A-C illustrates still further potential alternative embodiments. FIG. 4A illustrates that instead of a pair of guides 40S and 40P, a single guide 40A could be mounted on trailer 20. Guide 40A has inwardly and upwardly extending outer lateral sides that would essentially function similarly to sides 50S, 50P of guides 40S and 40P. Guide 40A could be either of a fixed shape or have adjustable members. FIG. 4A also illustrates in dashed lines that the height of member 40A could be higher (see reference numeral 41(U)) or lower (see reference numeral 41(L)). Guide 40A could also be made to different lateral widths.

FIGS. 4B and 4C are intended to illustrate the opposite outer lateral sides of the guide or guides (either a two-piece or one piece guide) could have different shapes compared to guides 40S and 40P. In FIG. 4B, those opposite sides of guides 40S(B) and 40P(B) have a more convex shape. In comparison, guides 40S(C) and 40P(C) of FIG. 4C have a more concave shape. These Figures are intended to show that a variety of different shapes and geometries can be used towards the end of having a narrower upper portion which serves as a gross positioning guide and wider lower portions that serve as more fine positioning, self-centering guides.

As previously mentioned, guide or guides 40 can be fixed (e.g. welded) in place. Alternatively, they can be removable and/or adjustable. This would allow different pontoon boats to be utilized with one trailer. Or the guide or guides 40 could be removed from trailer 20, if they are not needed or desired, or if the trailer is to be used for functions different than trailering a pontoon boat (e.g., adding a flatbed or box, or hauling some other vehicle).

Note also that other guiding structure could optionally be included on trailer 20. As shown in ghost lines in FIG. 2C, optional rollers 60 (FIG. 2C) could be positioned on the outside of pontoons 14S and 14P to assist in trailering boat 10. In this example, rollers 60 are towards the front of trailer 20. Others could be located elsewhere on trailer 20, if desired.

What is claimed is:

1. A pontoon boat trailer guide for use with a pontoon boat trailer having parallel longitudinal V-shaped bunks or receivers for the pontoons, the trailer guide comprising:
   a. a guide structure that extends upwardly from the general plane of and between the bunks or receivers on the trailer and is positioned between front and back ends of the bunks or receivers;
   b. the guide structure having opposite lateral sides comprising
      1. lower ends proximate the bunks or receivers;
      2. top ends wherein the opposite lateral sides converge towards each other as they extend upwardly;

3. so that the lateral distance between top ends of the opposite lateral sides is substantially smaller than the lateral distance between the insides of the pontoons, but the lateral distance between the lower ends of the opposite lateral sides is closer to the lateral distance between the pontoons.

2. The guide of claim 1 wherein the opposite outer lateral sides are configured to provide initial gross alignment of the pontoons relative the bunks or receivers of the trailer, but increasing fine and automatic alignment as the pontoons are brought closer to their bunks or receivers on the trailer.

3. The guide of claim 1 wherein the sloped opposite lateral sides of the trailer guide automatically force the pontoons to come into increasingly closer vertical alignment with their bunks or receivers the closer the pontoons come to the bunks or receivers.

4. The guide of claim 1 in combination with the trailer.

5. The guide of claim 4 in combination with a pontoon boat.

6. The guide of claim 5 wherein at least one pontoon of the pontoon boat comprises an external feature.

7. The guide of claim 6 wherein the external feature comprises at least one of a strake, a rib, or other structure extending from the surface of the pontoon.

8. The guide of claim 1 wherein the guide structure comprises a single integrated structure.

9. The guide of claim 1 wherein the guide structure comprises a pair of independent structures.

10. The guide of claim 9 wherein the independent structure comprises a generally A-frame shape.

11. The guide of claim 10 wherein the A-frame shape is adjustable in width and placement on a trailer.

12. The guide of claim 9 further comprising a second pair of generally A-frame shapes.

13. A method of trailering a pontoon boat from the water comprising:
    a. placing a guide structure between pontoon receivers on a trailer, the guide structure extending vertically from the horizontal plane of the receivers and having opposite lateral sides that converge from bottom to top;
    b. submerging the back of a trailer into the water but keeping a top of the guide structure emerged from the water;
    c. using the top of the guide structure to bring the pontoon boat over the trailer with the guide structure between pontoons of the pontoon boat;
    d. attaching a bow of the pontoon boat to a front of the trailer;
    e. moving the trailer out of the water;
    f. so that the guide structure initially maintains gross alignment of pontoons and receivers, but then provides fine alignment of pontoons with receivers.

14. An apparatus oriented with respect to a boat trailer for positioning into a proper loading position relative to said boat trailer a pontoon boat having at least two pontoons, said apparatus comprising:
    a. a pair of A-frame guides, said guides having two pivotally connected members adjustably secured to said trailer;
    b. said A-frame guides each having a surface for sliding engagement with each pontoon, so that when the boat is floating and is positioned for loading, the guides contact and move the pontoons into a final resting position.

15. The apparatus of claim 14 wherein the surface is a low-friction surface.

16. The apparatus of claim 15 wherein the low-friction surface consists of Teflon, high density plastic, or wood.

17. A pontoon boat trailer guide detachably secured to a pontoon boat trailer for assisting an operator of the boat in retrieving the boat and reducing the effects of drift, said trailer guide comprising:
    a. a pair of A-frames detachably secured to said pontoon boat trailer, each A-frame having two rigid members pivotally connected;
    b. said A-frame being pivotally adjustable to vary the acute angle between the members;
    c. said A-frame being longitudinally adjustable relative to the pontoon boat and pontoon boat trailer;
    d. said A-frames having a member with a surface for sliding engagement with a pontoon;
    e. said A-frames retrievably engaging an interior surface of the pontoon.

18. The guide of claim 17 wherein the surface is a low-friction surface.

19. The guide of claim 18 wherein the low-friction surface consists of Teflon, high density plastic, or wood.

20. A method for loading a pontoon boat onto a trailer in receiving position, comprising the steps of:
    a. providing the apparatus of claim 17;
    b. steering the boat over said trailer in receiving position, wherein the pontoons are proximate to a sliding surface of the apparatus;
    c. pulling the trailer in receiving position out of a body of water;
    d. guiding the pontoon boat into a resting position, wherein the pontoon boat contacts the sliding surface of the apparatus when the trailer is pulled out of the water;
    e. settling the pontoon boat into a final resting position.

\* \* \* \* \*